(12) United States Patent
Bohn et al.

(10) Patent No.: US 10,331,997 B2
(45) Date of Patent: Jun. 25, 2019

(54) ADAPTIVE CONFIGURATION OF A NEURAL NETWORK DEVICE

(71) Applicant: Seagate Technology LLC, Cupertino, CA (US)

(72) Inventors: Richard Esten Bohn, Shakopee, MN (US); Peng Li, Lauderdale, MN (US); David Tetzlaff, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 1136 days.

(21) Appl. No.: 14/522,192

(22) Filed: Oct. 23, 2014

(65) Prior Publication Data

US 2015/0324685 A1 Nov. 12, 2015

Related U.S. Application Data

(60) Provisional application No. 61/990,058, filed on May 7, 2014.

(51) Int. Cl.
*G06N 3/04* (2006.01)

(52) U.S. Cl.
CPC ........................ *G06N 3/04* (2013.01)

(58) Field of Classification Search
None
See application file for complete search history.

(56) References Cited

U.S. PATENT DOCUMENTS

| 6,145,072 | A | 11/2000 | Shams et al. |
| 8,443,169 | B2 | 5/2013 | Pechanek |
| 8,527,276 | B1 | 9/2013 | Senior et al. |
| 2010/0088490 | A1* | 4/2010 | Chakradhar ............ G06F 8/45 712/34 |
| 2011/0029471 | A1* | 2/2011 | Chakradhar ........... G06N 3/063 706/25 |
| 2011/0119467 | A1* | 5/2011 | Cadambi ............ G06F 15/7821 712/27 |
| 2013/0297539 | A1 | 11/2013 | Pickniewski et al. |
| 2014/0089232 | A1 | 3/2014 | Buibas et al. |
| 2014/0180989 | A1* | 6/2014 | Krizhevsky ............ G06N 3/063 706/31 |
| 2015/0170021 | A1* | 6/2015 | Lupon .................... G06N 3/063 706/15 |

OTHER PUBLICATIONS

Bayliss et al, Optimizing SDRAM Bandwidth for Custom FPGA Loop Accelerators, 2012.*
(Continued)

*Primary Examiner* — Li B. Zhen
*Assistant Examiner* — Mikayla Chubb
(74) *Attorney, Agent, or Firm* — Hollingsworth Davis, LLC

(57) ABSTRACT

A first input is processed via a first configuration of a neural network to produce a first output. The first configuration defines attributes of the neural network, such as connections between neural elements of the neural network. If the neural network requires a context switch to process a second input, a second configuration is applied to the neural network to change the attributes, and the second input is processed via the second configuration of the neural network to produce a second output.

18 Claims, 7 Drawing Sheets

(56) References Cited

OTHER PUBLICATIONS

Broere, A memory-centric SIMD neural network acccelerator balancing efficiency and flexibility, 2013.*
Chakradhar et al, A Dynamically Configurable Coprocessor for Convolutional Neural Networks, 2010.*
Majumdar et al, A Massively Parallel, Energy Efficient Programmable Accelerator for Learning and Classification, 2012.*
Peemen et al, Memory-Centric Accelerator Design for Convolutional Neural Networks, 2013.*
Xie, A flexible memory shuffling unit for image processing accelerators, 2013.*
Indiveri et al, Integration of nanoscale memristor synapses in neuromorphic computing architectures (Year: 2013).*

* cited by examiner

ADAPTIVE CONFIGURATION OF A NEURAL NETWORK DEVICE

CROSS-REFERENCE TO RELATED APPLICATIONS

The present application claims benefit of priority to U.S. Provisional Patent Application No. 61/990,058 entitled "ADAPTIVE CONFIGURATION OF A NEURAL NETWORK DEVICE" and filed on May 7, 2014, which is specifically incorporated by reference for all that it discloses or teaches.

SUMMARY

Various embodiments described herein are generally directed to methods, systems, apparatuses, and computer-readable media that facilitate adaptive configuration of a neural network device. In one embodiment, a first input is processed via a first configuration of a neural network to produce a first output. The first configuration defines attributes of the neural network, the attributes including at least connections between neural elements of the neural network. The method further involves determining that the neural network requires a context switch to process a second input. A second configuration is applied to the neural network to change the attributes, and the second input is processed via the second configuration of the neural network to produce a second output.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
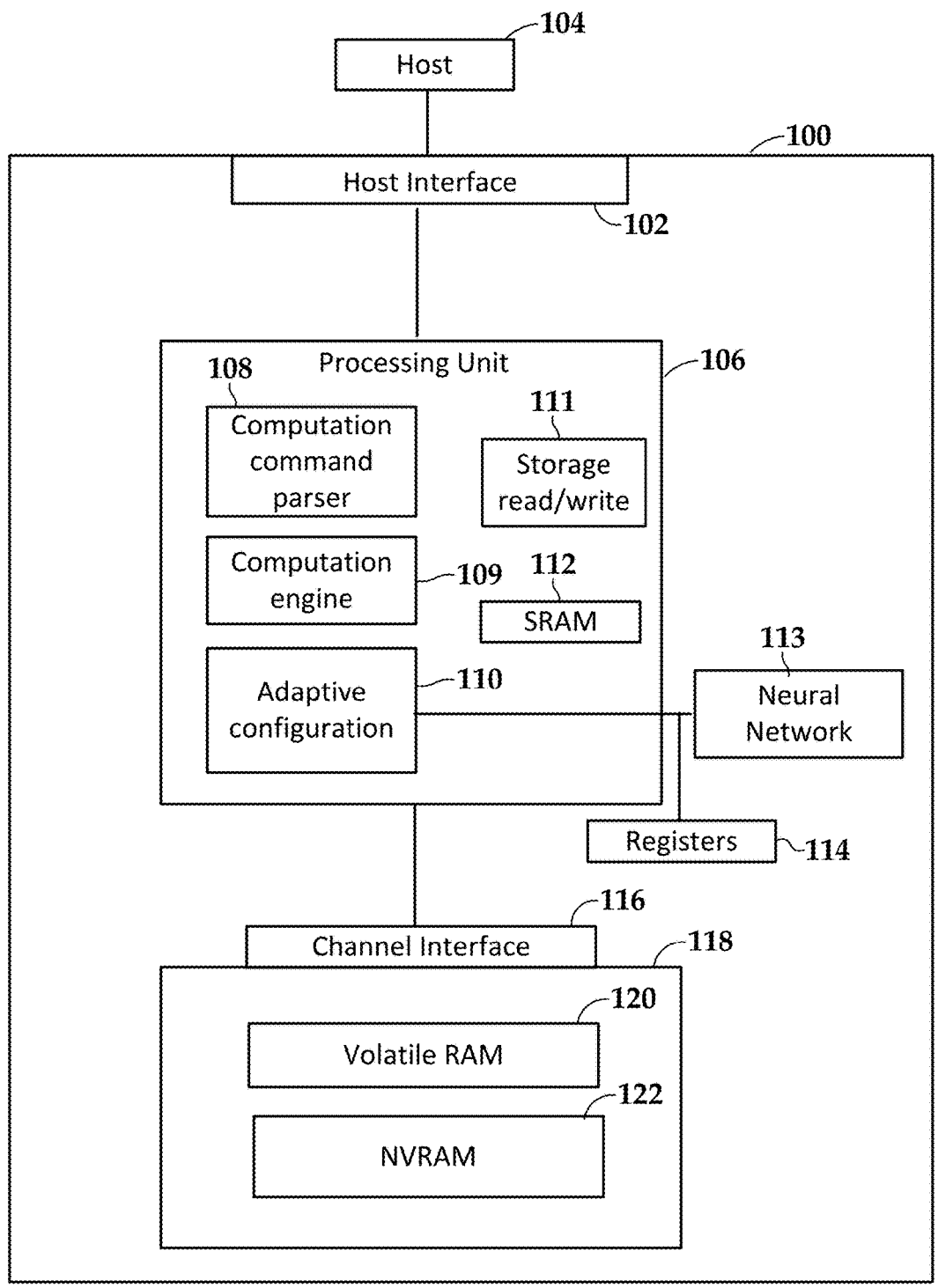
FIG. 1 is a block diagram of a storage compute device according to an example embodiment.

Some computational tasks are well suited to be performed using massively distributed computing resources. For example, data centers that provide web services, email, data storage, Internet search, etc., often distribute tasks among hundreds or thousands of computing nodes. The nodes are interchangeable and tasks may be performed in parallel by multiple computing nodes. This parallelism increases processing and communication speed, as well as increasing reliability through redundancy. Generally, the nodes are rack mounted computers that are designed to be compact and power efficient, but otherwise operate similarly to desktop computer or server.

For certain types of tasks, it may be desirable to rearrange how data is processed within the individual computing nodes. For example, applications such as neuromorphic computing, scientific simulations, etc., may utilize large matrices (or similar data structures) that are processed in parallel by multiple computing nodes. In a traditional computing setup, matrix data may be stored in random access memory and/or non-volatile memory, where it is retrieved, operated on by relatively fast central processor unit (CPU) cores, and the results sent back to volatile and/or non-volatile memory. It has been shown that the bus lines and I/O protocols between the CPU cores and the memory can be a bottleneck for this type of computation.

This disclosure generally relates to use of a data storage device that performs internal computations on data on behalf of a host, and is referred to herein as a storage compute device. While a data storage device, such as a hard drive, solid-state drive (SSD), hybrid drive, etc., generally include data processing capabilities, such processing is related to the storage and retrieval of user data. So while the data storage device may perform some computations on the data, such as compression, error correction, etc., these computations are invisible to the host, and results of the computation are not expressly returned to the host as a result of the computation. Similarly, other computations, such as logical-to-physical address mapping, involve tracking host requests, but are intended to hide these tracking operations from the host.

While a storage compute device as described herein may be able to perform as a conventional storage device, e.g., handling host data storage and retrieval requests, such devices may include additional computational capability that can be used for certain applications. For example, scientific and engineer simulations may involve solving matrix equations on very large matrices. Even though the matrices may be sparse, and therefore amenable to a more concise/compressed format for storage, the matrices may be still be so large as to prevent solution using random access memory (RAM) of a single computing node. Other types of problems, e.g., neural networks, image processing, etc., may use large data sets and so may face similar challenges.

One solution to solving these large data set problems is to distribute the solution among a number of nodes coupled by a network. Each node will solve part of the problem, and various internode messages are passed to coordinate operations and shared data between the nodes. While this can alleviate the need for large amounts of RAM on each node, it has been found that in some cases this does not effectively use processing resources. For example, the central processing units (CPUs) may spend significant amounts of time waiting for network input/output (I/O) and be underutilized as a result.

It generally accepted that compute performance can be improved by keeping the data "close to" the processors that operate on the data. This closeness refers both to physical proximity and reduction in the number of different communications channels and protocol layers that lie between the data in memory and the processor. While CPU and RAM might qualify as close to one another (particularly when using hierarchical memory caches), the size of system RAM may be limited for some problems. In such a case, the system bottlenecks occur in from slower channels (e.g., disk drives, network interfaces) moving data in and out of RAM as needed.

For problems and applications that work on very large sets of data, a local non-volatile memory may be needed to store the data sets, as well as intermediate results of calculations. While the speed of currently available non-volatile RAM (NVRAM) is appreciably slower than currently available dynamic RAM (DRAM), for problems with large data sets, an increase in performance may be seen by performing the computations on the storage device itself. While the processor and memory resident on typical storage devices may be slower than CPU and RAM of typical computers, the amount of NVRAM available can be orders of magnitude greater than RAM for similar cost. Further, the storage device can move large amounts of data between its non-volatile memory and its local processor more quickly that it could move the same data to a CPU via an I/O bus. Internal data processing does not have to deal with contention, translation, protocols, etc., that is involve in moving data between the host interface of the storage device and the CPU cores.

In the present disclosure, a storage compute device may utilize configurable neural network circuitry. This circuitry may have structures and behaviors that mimic biological neurons. The neural network circuitry may include random access memory. Some neural networks work with large data sets that are stored in non-volatile memory. In the past, some of this processing has been done on large-scale computing clusters that implement the neural network in software. Implementing a neural network in hardware allows for a storage compute device to more quickly and efficiently process the data, but physical limits may bound the size practical to implement on the device. Generally, a hardware device that physically implements a neural network in circuitry may not be able to represent the entire network being processed, e.g., because of die size, cost, heat, power limitations, etc. The storage compute devices described herein can deliver the hardware performance of a large physically-implemented neural network structure in a cost-sensitive and physically practical manner.

In FIG. 1, a block diagram shows a storage compute device 100 according to an example embodiment. The storage compute device 100 may provide capabilities usually associated with data storage devices, e.g., storing and retrieving blocks of data, and may include additional computation abilities as noted above. Generally, the storage compute device 100 includes a host interface 102 configured to communicate with a host 104. The host interface 102 may use electrical specifications and protocols associated with existing hard drive host interfaces, such as SATA, SaS, SCSI, PCI, Fibre Channel, etc.

The storage compute device 100 includes a processing unit 106. The processing unit 106 includes hardware such as general-purpose and/or special-purpose logic circuitry configured to perform functions of the storage compute device 100, including functions indicated in functional blocks 108-112. Functional block 111 provides legacy storage functionality, such as read, write, and verify operations on stored data. Blocks 108-110, and 112 represent specialized functionalities that allow the storage compute device 100 to provide internal computations on behalf of the host 104.

Block 108 represents a command parser that manages object-specific and computation-specific communications between the host 104 and storage compute device 100. For example, the block 108 may process commands that define objects (matrices, vectors, scalars, sparse distributed representations) and operations (e.g., scalar/matrix mathematical and logical operations) to be performed on the objects. A computation engine 109 performs the operations on the objects, and may be specially configured for a particular class of operation. For example, if the storage compute device 100 is configured to perform a set of matrix operations, then the computation engine 109 may be optimized for that set of operations. The optimization may include knowledge of how best to store and retrieve objects for the particular storage architecture used by the storage compute device 100.

In this embodiment, an adaptive configuration block 110 facilitates adapting system performance for various neuromorphic computing operations. The adaptive configuration block 110 is coupled to configurable neural network circuitry 113. This circuitry 113 can be configured by loading a configuration, e.g., from memory 118, and applying the configuration, e.g., by writing to one or more registers associated with the neural network circuitry 113. This can change links between individual neural elements of the circuitry 113, thereby enabling the circuitry to perform a different function, process different data, etc. If the neural network is implemented in random access memory, loading the configuration may involve copying the data into selected regions of memory.

The functional blocks 108-112 may access persistent storage, by way of a channel interface 116 that provides access to memory 118. There may be multiple channels, and in such a case there may be a dedicated channel interface 116 and computation engine 109 for each channel. The memory 118 may include both volatile memory 120 (e.g., DRAM and SRAM) and non-volatile memory (e.g., flash memory, magnetic media) 122. The volatile memory 120 may be used as a cache for read/write operations performed by read/write block 111, such that a caching algorithm ensures data temporarily stored in volatile memory 120 eventually gets stored in the non-volatile memory 122. The computation blocks 108-110, and 112 may also have the ability to allocate and use volatile memory for calculations. Intermediate results of calculations may remain in volatile memory 120 until complete and/or be stored in non-volatile memory 122.

Figure 2:
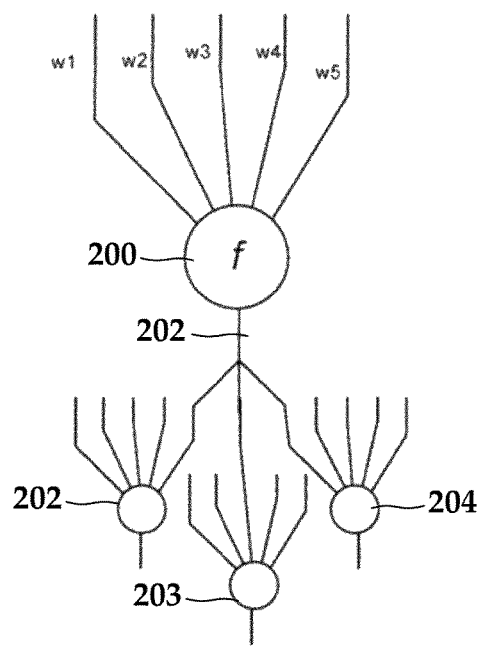
FIG. 2 is a block diagram of a subset of a neural network according to an example embodiment.

In reference now to FIG. 2 a block diagram shows a portion of a neural network according to an example embodiment. This may be part of a neural network such as configurable neural network circuitry 113 in FIG. 1. In this example, four neural elements 200-204 are shown. Each neural element 200-204 includes at least one input that may be connected to an output of other neural elements. For example, path 206 represents one output of neural elements 202-204 connected to an input of neural element 200. Each of the neural elements 200-204 includes a transfer function (e.g., function $f$ seen in element 200) for converting the inputs to outputs. Each of the outputs may have different weightings (e.g., w1-w5) that affect the strength of the connections. This neuron model may be implemented in very-large-scale integrated (VLSI) circuitry that performs this function in an analog and/or a digital computation fashion. In the present disclosure, the term neural network, neural circuit, neural element, etc., may refer to specialized neural circuitry, general purpose implementation (e.g., via software in volatile memory) or a hybrid thereof.

To describe a neural network, the connection and neuron attributes (which outputs are connected to which inputs, weightings of the connections, transfer functions, etc.) may be defined either manually or automatically. For example, a learning phase using representative input data sets may be used to define the connections, weightings, transfer functions, etc., either in the neural network circuitry or via another mechanism (e.g., via software-based network). In a large neural network these attributes (connectivity, weighting, transfer functions, etc.) may vary over the entire network. These attributes can then be applied to local neural networks resident on any number of devices to perform similar functions independent of one another.

In some cases, the learning phase is sufficient to define a neural network that performs a particular task, and thereafter the neural network attributes may remain fixed. This may be useful in some applications, such as text recognition, where the input domain (e.g., shapes of characters) is well known and relatively unchanging over time. In other cases, the attributes of the neural network may be continuously updated, resulting in continuous learning. This later case may be useful in less well-defined input domains and/or where input trends may change over time. In either case, the resulting neural network may become too large for practical implementation using in a storage compute device or similar apparatus.

The neural network using elements as shown in FIG. 2 may be implemented in specialized analog or digital VLSI circuits and may be externally controlled by general-purpose processor that uses instructions and data stored in the memory of a computing device. For example, a program running on a processor may send inputs to the neural network, control the speed of the processing, and process outputs. The processor may also set neural network attributes (connectivity, weighting, transfer functions) by writing to a register or other hardware interface (e.g., universal asynchronous receiver/transmitter ("UART"). This setting of attributes can be performed once, or the attributes may change over time if the neural network is configured for continuous learning. This allows the neural network to be reconfigured as desired via a controller.

The storage compute device may include one or more sets of configuration registers 114 that process this connectivity, weighting, and function information. The configuration registers 114 may be part of the neural network circuitry 113 and/or a separate logic circuit that acts as a driver for the circuitry 113. The registers 114 are associated with hardware and/or firmware having the capability of changing attributes of the neural network circuitry between batches of data to be processed. These attribute changes result in mapping physical neuron models to the virtual neuron models used for a particular computation.

As noted above, cost and physical considerations limit the size of the neural network circuitry 113. In order to implement larger neural networks, the networks are broken into smaller sub-networks, and each can be switched into the neural network circuitry 113. In this way the hardware works on one section of the computation at a time, context switching to other computations as different batches of source data or intermediate results are completed. There are a number of different ways the network can be segmented, as will be described in further detail below.

Figure 3:
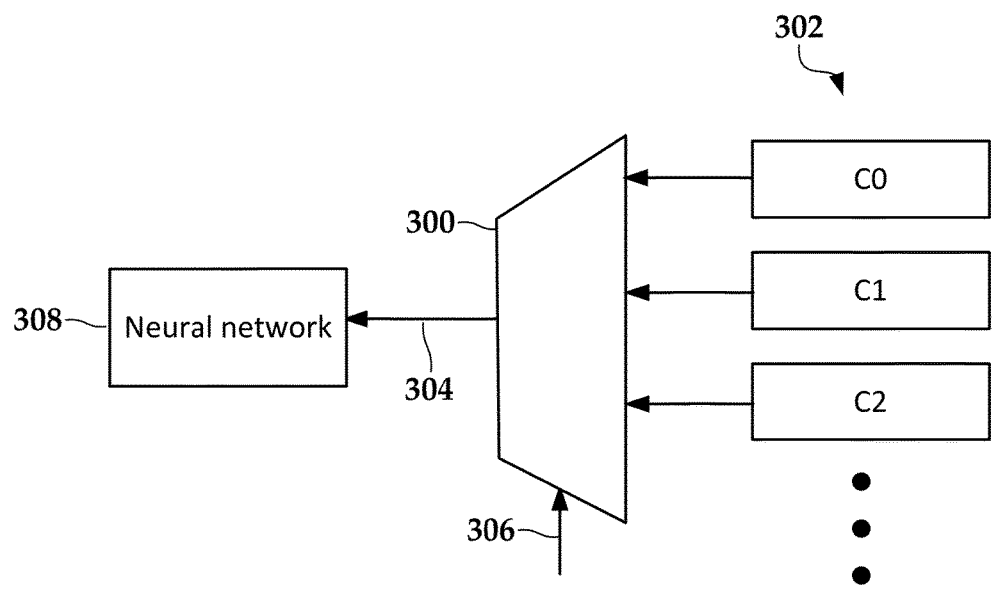
FIGS. 3 and 4 are block diagrams illustrating configuration selection circuits according to example embodiments.

In FIG. 3, a block diagram illustrates a configuration selection circuit according to an example embodiment. A switching element 300 (e.g., multiplexer) switches between one of a plurality of contexts 302. A signal 306 indicates a context switch that is performed by the switching element 300. The signal can be in response to a number of conditions, such as changes to an input context (e.g., sensor input) of the neural network, different processing phases of the neural network, different processing type of the neural network, etc. The different contexts 302 may result in changes to the neural network circuitry, such as changing connection maps, functions, weighting, numbers of active neurons, etc. The contexts 302 may include references to a portion of memory and/or a stored data file that includes the attributes of the new context. In other arrangements, the contexts 302 may include data buffers that temporarily store the associated context data.

The output of the switching element 300 is selected context data 304 that is sent to a neural network 308. The neural network 308 may include neural network circuitry 113 as in FIG. 1, and/or a neural network implemented in software, e.g., via computation engine 109. The context data 304 is then loaded into the neural network 308 to reconfigure its attributes. The loading of attributes may be synchronized with other actions, such as pausing processing and input/outputs of the previous context. Further, if the neural network circuitry was in a learning phase prior to the context switch, then stored data that reflects the old context may be updated before switching context to capture any attributes that changed as a result of the learning.

Circuitry that supports more than one set of neural network attributes has the capability of quickly switching between the various configurations through multiplexor circuitry to speed the rate at which context switches are made. Configuration data that describes attributes of the multitude of contexts may be stored in a variety of places depending on size and application. This could include static RAM (SRAM), DRAM, NAND flash, hard disk drive (HDD) media, etc.

Generally, the illustrated components facilitate context-switchable neural network hardware for handling larger neural networks that the implemented hardware is capable of processing. For example, if the neural network hardware represents contexts in RAM, and the amount of available RAM for neural networks is limited to 16 GB, each of the contexts may take up 16 GB or less and be stored in non-volatile memory and swapped into RAM as needed. If each of the contexts take up less than 8 GB, then one context could be currently operated on in RAM while the next context is being loaded in, each taking less than or equal to the available RAM. A similar adaptation may be made if the system represents the neural networks in custom neural VLSI circuits. If the network is limited to 16M nodes, the contexts may be stored in non-volatile memory and switched in and out as configuration registers according to the size of the context.

In another embodiment, a storage compute device can be configured to adapt non-volatile memory (e.g., NAND flash) data access patterns to increase throughput on a configurable neural network hardware device. In a hardware device which implements configurable neural network circuitry, source data stored on NAND flash media (or similar storage) could face a problem of not knowing when data for a specific context may be available. Due to the nature of NAND media, this data may arrive at the computation engine out-of-order from which it was requested. Loading all of the configuration registers for the neural network may take some time, so being able to know as far in advance as possible when data for a given context is completed is can help maintain media-rate throughput through the neural network computation circuitry.

Figure 4:
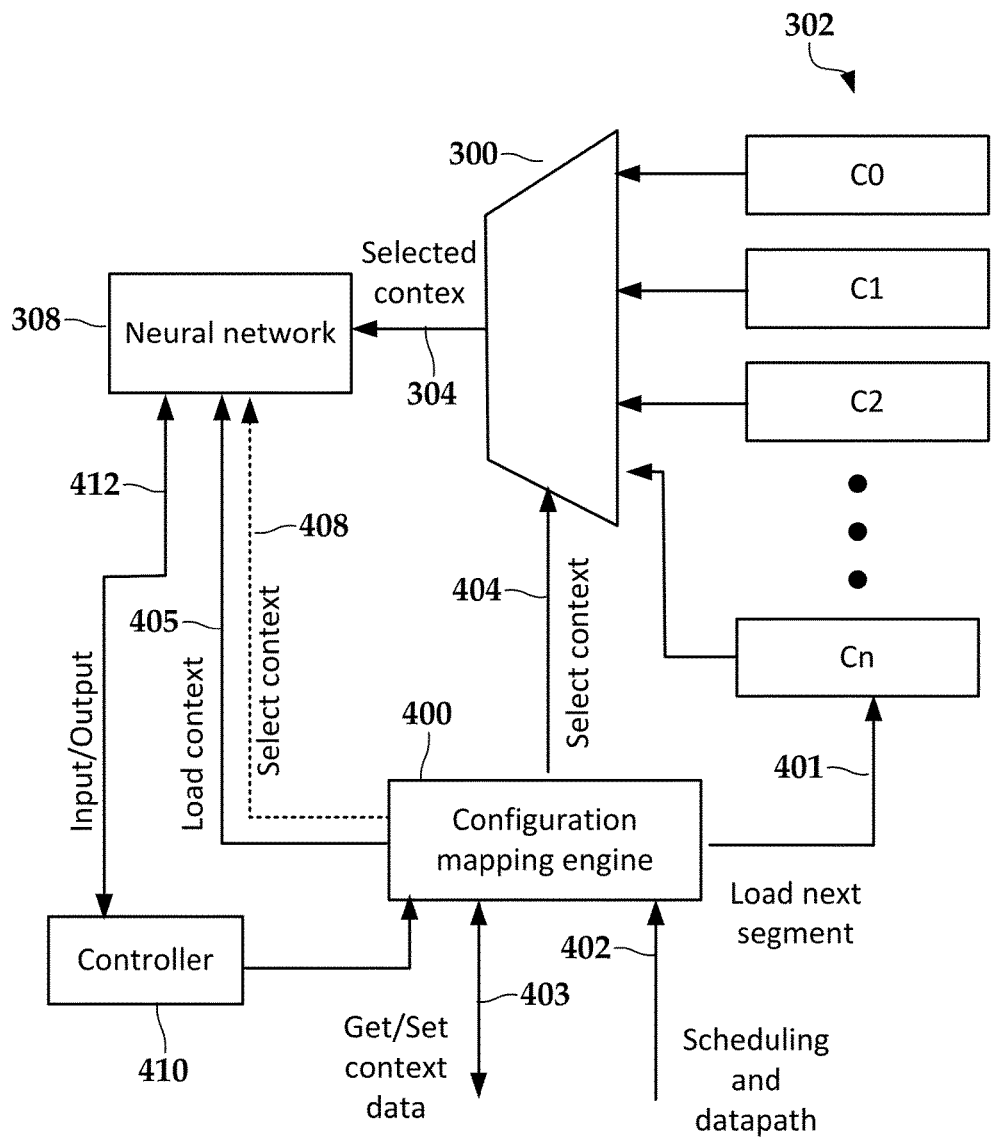

Generally, the adaptive configuration block 110 compensates for out-of-order nature of NAND flash accesses, increasing NAND media rate throughput for providing attribute data for configurable neural networks. In FIG. 4, a block diagram illustrates parts of a hardware device that can fetch and load neural network attribute information according to an example embodiment. This device includes similar components as shown and described in relation to FIG. 3, such as switching element 300, a plurality of contexts 302, selected context data 304, and neural network 308.

The device includes a controller 410 that oversees processing performed by the neural network. Generally, this involves controlling inputs to and outputs from the neural network 308, as indicated by path 412. The controller 410 also causes context switches to be applied to the neural network 308 by way of a configuration mapping engine 400. The configuration mapping engine 400 can be implemented as a hardware device or software component. The configuration mapping engine 400 fetches, configures, and context switches the configurable neural network 308. The context switches are made by copying context configuration data from a persistent memory. Some forms of this memory, such as NAND flash, may provide data that is possibly out-of-order relative to an order of data access requests. The configuration mapping engine 400 includes features for dealing with this out of order access.

The configuration mapping engine 400 tracks physical locations of attribute information of each of the neural network contexts 302. The configuration mapping engine 400 is capable of fetching attribute data and loading it into a buffer for use by the switching element 300, via data line 401. Via data line 402, the configuration mapping engine 400 receives information from the NAND media subsystem regarding the scheduling of NAND media accesses. Using this data 402, the configuration mapping engine 400 generates an ordering of contexts as they will be received rather than as they were submitted. This data 402 may be provided through firmware or may be provided by hardware circuitry involved in the scheduling of NAND media accesses. The configuration mapping engine 400 also loads and stores context data from storage media via data line 403.

The configuration mapping engine 400 selects a next context via select line 404, and causes the context data to be loaded via set line 405. In one arrangement, the neural network 308 may implement only one set of configuration registers, such that processing by the neural network is paused while the attribute data for a context 302 is loaded via switching element 300, which overwrites a previous context. In such a case, the configuration mapping engine 400 (or other component) may cause the neural network 308 to pause processing so that the context data may be loaded between each processing burst.

In other arrangements, the configurable neural network 308 may support multiple configuration registers, such that the neural network 308 is able to internally switch contexts based on a signal received from the configuration mapping engine 400. In such a case, the internal registry of the neural network 308 may implement an analogous switching element (not shown), and the configuration mapping engine 400 may signal a context switch by sending select signal 408 directly to the neural network 308. The configuration mapping engine 400 may still use an external switching element 300 to preload data of the contexts 302 into unused registers of the neural network 308. In either case, the configuration mapping engine 400 receives information either from firmware or from the related data path hardware about the precise timing when data is available or when data is completed being processed to facilitate the timing of these context switches.

Figure 5:
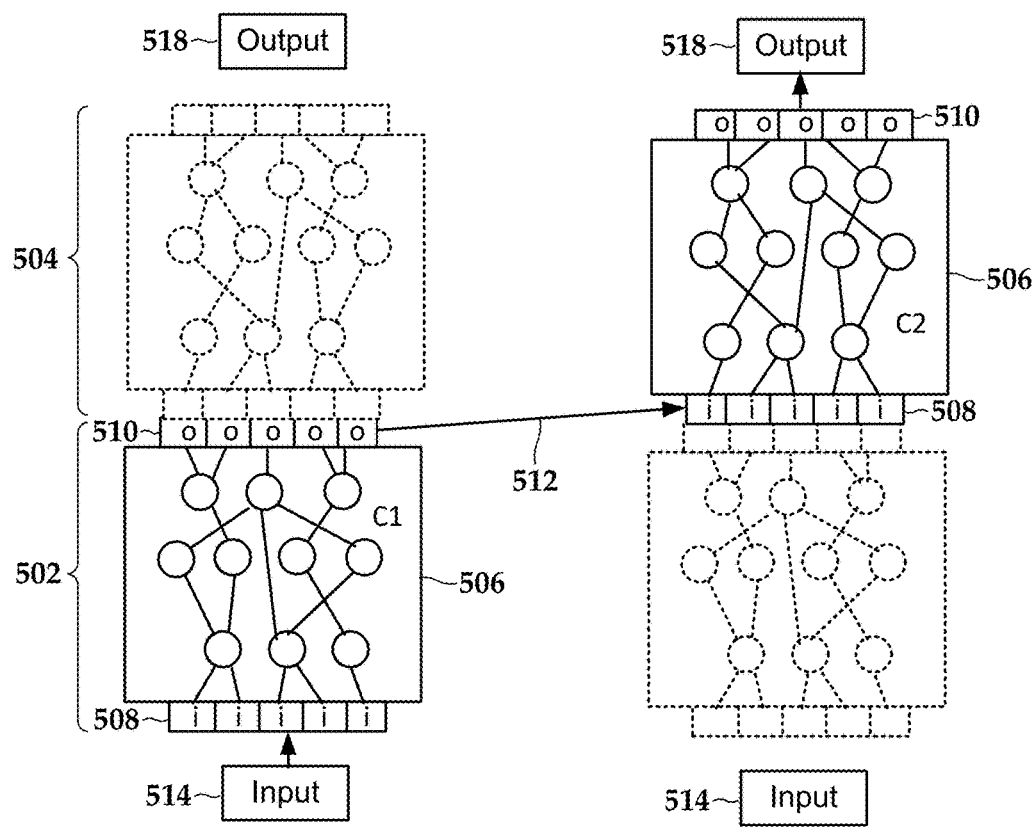
FIGS. 5-9 are block diagrams illustrating context switching according to example embodiments.

The neural network contexts described above may be used to break a neural network into smaller portions that can fit into available neural network hardware and/or RAM. In FIG. 5, a block diagram illustrates context switching according to an example embodiment. A single, virtual, neural network is divided into lower layer 502 and upper layer 504. The both layers 502, 504 are too large to fit together into available neural network hardware 506, which may include custom circuitry and/or RAM. The neural network hardware 506 includes input and output buffers 508, 510. The input buffer 508 includes data (e.g., a sparse matrix/vector) that is input to lower levels within the neural network hardware 506. The results of the processing obtained from higher levels of the neural network hardware 506 are placed in the output buffer 510, which may be a different size than the input buffer 508.

In this case, the processing moves from the lower layer 502 to the higher layer 504, as indicated by input 514 and output 516. As seen in the left side of FIG. 5, the lower layer 502 is first implemented by loading context C1 into the neural network hardware 506. As indicated by the dashed lines for layer 504 on the left side of the figure, this attributes of the upper layer 504 are known (and stored elsewhere) but not yet realized in hardware. An input 511 to layer 502 is copied to the input buffer 508, and results of processing by the neural network hardware 506 are placed in the output buffer 510.

The right side of FIG. 5 represents a context switch, in which context C2 is loaded into the neural network hardware 506. The contents of the output buffer 510 are moved into the input buffer 508, as indicated by line 512. Thereafter, the neural network hardware 506 solves the second layer of the network, and places the result in output buffer 510. As should be apparent, this can be repeated for any number of layers. Generally, this may be easier to implement if layer dependency is one way, e.g., the higher layers depend on the input of the lower layers, and not vice versa. However, even if there is a two-way dependency, this can be handled by, e.g., performing iterations or dividing the network to along other boundaries to enforce one-way dependency.

Figure 6:
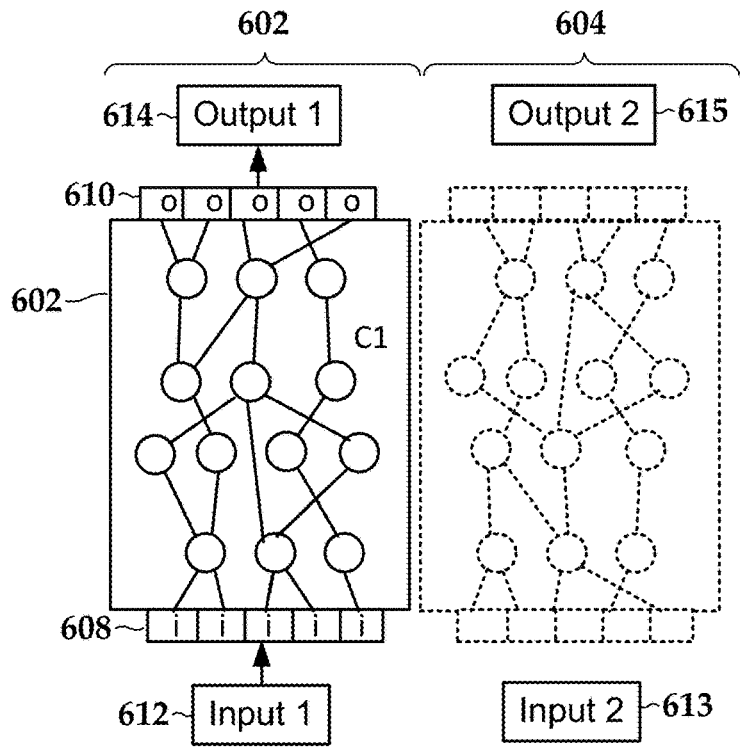
Figure 7:
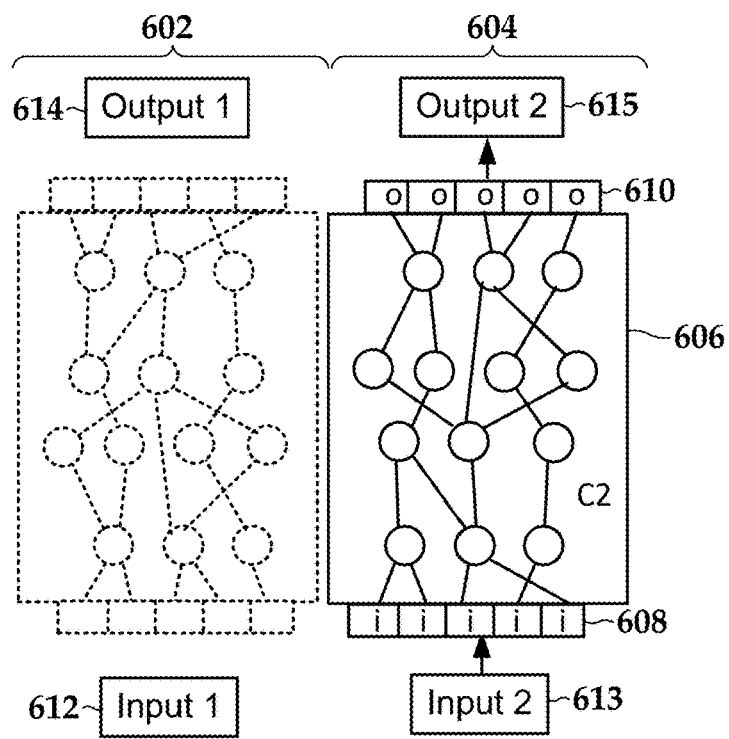

In FIGS. 6 and 7, block diagrams illustrate utilizing context switches according to another example embodiment. As seen in FIG. 6, two neural networks 602, 604 are used to processes inputs 612, 613 to produce two, parallel outputs 614, 615. The inputs 612, 613 may be from different sources (e.g., different sensors), from the same source but otherwise different (e.g., different decoding). As an example of the latter, the neural networks 602, 604 may provide different results for the same input, e.g., trained to extract different features. In one arrangement, the inputs 612, 613 may be divisions of a larger input that are separately processed by the neural networks 602, 604, and the outputs 614, 615 combined as a result. In such a case, there may or may not be dependency between the networks 602, 604. These dependencies may be dealt with as described above regarding FIG. 5.

The neural networks 602, 604 are too large to fit together into available neural network hardware 606, which may include custom circuitry and/or RAM. The neural network hardware 606 includes input and output buffers 608, 610 similar to those described in FIG. 5. In this case, each network 602, 604 can be processed separately. As seen in FIG. 6, the neural network 602 is first implemented by loading context C1 into the neural network hardware 606. As indicated by the dashed lines for neural network 604 on the right side of the figure, this attributes of the neural network 602 are known (and stored elsewhere) but not yet realized in hardware. The input 612 is copied to the input buffer 608, and results of processing by the neural network hardware 606 are placed in the output buffer 610 and used as output 614.

The block diagram of FIG. 7 represents a context switch, in which context C2 is loaded into the neural network hardware 606. The contents of the input 613 are moved into the input buffer 608. Thereafter, the neural network hardware 606 processes the input 613 and places the result in output buffer 610, where it is used as output 615. As should be apparent, this can be repeated for any number of parallel-processed networks.

Figure 8:
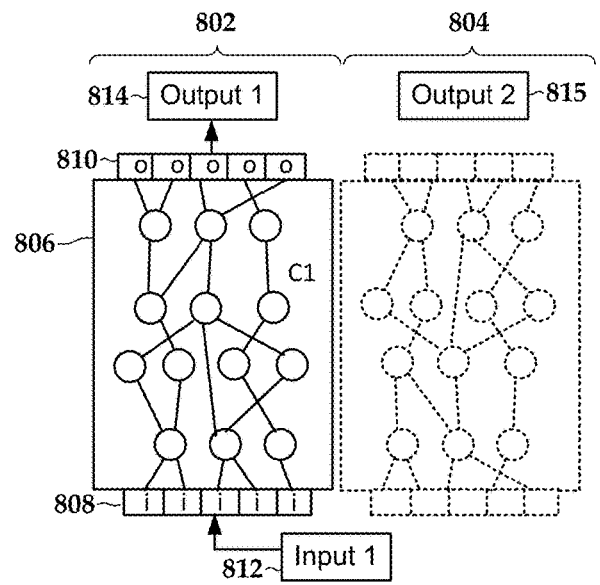
Figure 9:
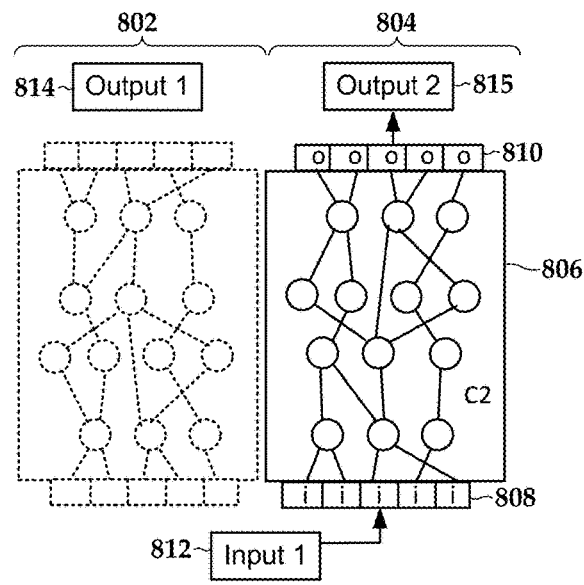

In FIGS. 8 and 9, block diagrams illustrate utilizing context switches according to another example embodiment. As seen in FIG. 6, two neural networks 802, 804 are used to process a single input 812, yet produce different parallel outputs 814, 815. The neural networks 802, 804 may be, e.g., trained to extract different features. The neural networks 802, 804 are too large to fit together into available neural network hardware 806, which may include input and output buffers 808, 810 similar to those described in FIG. 5. In this case, each network 802, 804 can be processed separately.

As seen in FIG. 8, the neural network 802 is first implemented by loading context C1 into the neural network hardware 806. As indicated by the dashed lines for neural network 804 on the right side of the figure, this attributes of the neural network 802 are known (and stored elsewhere) but not yet realized in hardware. The input 812 is copied to the input buffer 808, and results of processing by the neural network hardware 806 are placed in the output buffer 810 and used as output 814.

The block diagram of FIG. 9 represents a context switch, in which context C2 is loaded into the neural network hardware 806. The contents of the input 812 were previously moved into the input buffer 808 as shown in FIG. 8, and so there may be no need to recopy the input 812 to the input buffer 808 after the context switch. Thereafter, the neural network hardware 806 processes the input 812 and places the result in output buffer 810, where it is used as output 815.

Figure 10:
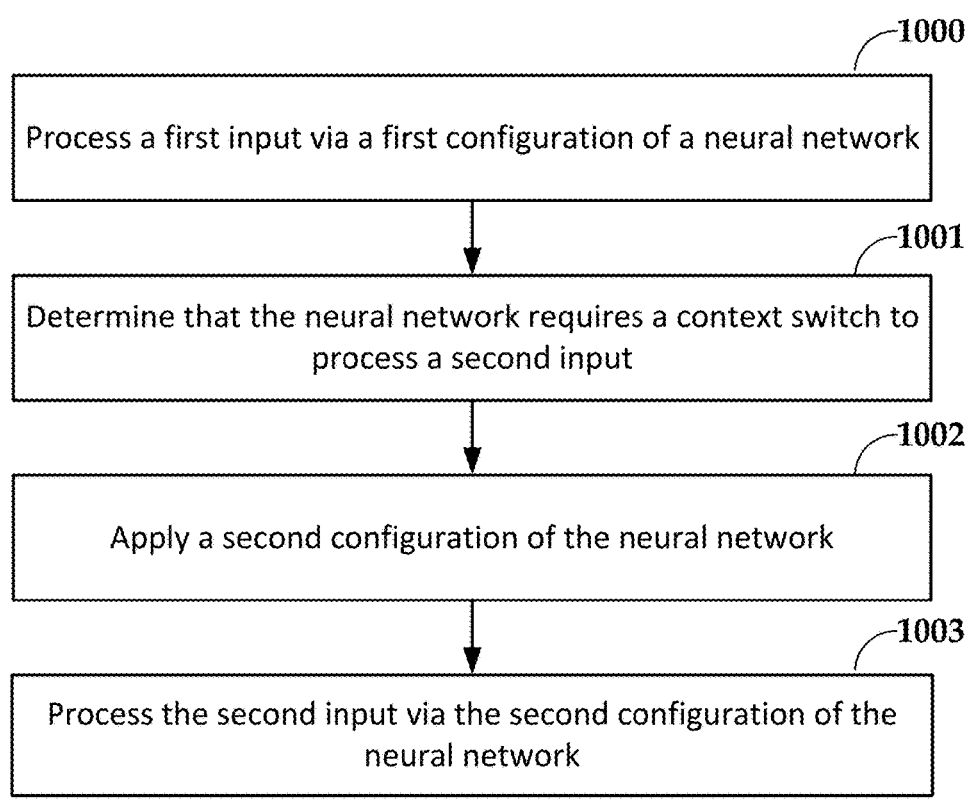
FIG. 10 is a flowchart of a method according to an example embodiment.

In FIG. 10, a flowchart illustrates a method according to an example embodiment. The method involves processing 1000 a first input via a first configuration of a neural network to produce a first output. The first configuration defines attributes of the neural network. The attributes include at least connections between neural elements of the neural network. The attributes may also include weightings of the connections and/or transfer functions of the neural elements. It is determined 1001 the neural network requires a context switch to process a second input. In response, a second configuration is applied 1002 to the neural network to change the attributes. For example, the second configuration may be loaded from a memory copied to a configuration register of the neural network. The second input is processed 1003 via the second configuration of the neural network to produce a second output.

The first and second configurations may correspond to layers of a virtual neural network, such that the second input comprises the first output. In other arrangements, the first and second configurations correspond to first and second neural networks that produce parallel outputs. In either case a case, the neural network may include network circuitry, and the virtual neural network or first and second neural networks may be too large to be represented in the neural network circuitry.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    processing a first input using a first configuration of a sparse neural network to produce a first output, the first configuration defining attributes of the sparse neural network, the attributes a plurality of connections between neural elements of the neural network, the neural elements comprising specialized neural network circuitry, each of the neural elements having a transfer function defined during a previous learning phase that converts inputs to outputs of the neural elements, each of the outputs corresponding to one of the connections and having a weighting defined during the previous learning phase that affects the corresponding connection, the attributes defining which of the inputs and the outputs are coupled by the connections, the transfer functions and the weightings the attributes further defining;
    determining that the neural network requires a context switch to process a second input;
    loading a second configuration from a persistent memory, the second configuration comprising changed attributes which include second connections between the neural elements, second values of the transfer functions, and second values the weightings, the changed attributes having been defined during the previous learning phase;
    copying the second configuration to a configuration register of the neural network to apply the changed attributes to the neural network; and
    processing the second input using the second configuration of the neural network to produce a second output.

2. The method of claim 1, wherein the first and second configurations correspond to layers of a virtual neural network, and the second input comprises the first output.

3. The method of claim 2, wherein the virtual neural network is too large to be represented in the neural network circuitry.

4. The method of claim 1, wherein the first and second configurations correspond to first and second neural networks that produce parallel outputs.

5. The method of claim 4, wherein the first and second neural networks are too large to be represented in the neural network circuitry together.

6. The method of claim 1, wherein the persistent memory provides context configuration data out of order relative to data access requests, the method further comprising:
    receiving scheduling information regarding the data access requests directed to the persistent memory; and
    generate an ordering of context configuration to ensure a desired delivery order of the context configuration data.

7. The method of claim 1, wherein the neural network comprises two or more configuration registers, and copying the second configuration to the configuration register comprises:
    copying the second configuration to a second of the two or more configuration registers, wherein the first configuration is stored in a first of the two or more configuration registers; and
    signaling to the neural network to use the second configuration register.

8. The method of claim 1, further comprising pausing the processing of the first input before processing the second input.

9. An apparatus comprising:
a sparse neural network comprising specialized neural network circuitry that includes:
a plurality of neural elements each having a transfer function that converts inputs to outputs of the neural elements;
a plurality of connections that couple the inputs to the outputs of different ones of the neural elements, each of the connections and having a weighting that affects the connection; and
a configuration register that changes attributes of the sparse neural network, the attributes having been defined during a previous learning phase and including which of the inputs and the outputs are coupled by the connections, the transfer functions of the neural elements, and the weightings of the connections;
a controller coupled to the sparse neural network and operable to:
determine that the sparse neural network requires a context switch to process a second input, the sparse neural network currently processing a first input via a first configuration of the attributes of the sparse neural network;
load a second configuration from a persistent memory, the second configuration comprising changed attributes which include second connections between the neural elements, second values of the transfer functions, and second values the weightings, the changed attributes having been defined during the previous learning phase;
copy the second configuration to the configuration register of the sparse neural network to apply the changed attributes to the sparse neural network; and
process the second input via the second configuration of the sparse neural network to produce a second output.

10. The apparatus of claim 9, wherein the first and second configurations correspond to layers of a virtual neural network.

11. The apparatus of claim 10, wherein the virtual neural network is too large to be represented in the neural network circuitry.

12. The apparatus of claim 9, wherein the first and second configurations correspond to first and second neural networks.

13. The apparatus of claim 12, wherein and the first and second neural networks are too large to be represented in the neural network circuitry together.

14. The apparatus of claim 12, wherein the persistent memory provides context configuration data out of order relative to data access requests, the controller further configured to:
receive scheduling information regarding the data access requests; and
generate an ordering of context configuration to ensure a desired delivery order.

15. The apparatus of claim 12, wherein the neural network comprises two or more configuration registers, and copying the second configuration to the configuration register comprises:

copying the second configuration to a second of the two or more configuration registers, wherein the first configuration is stored in a first of the two or more configuration registers; and
signaling to the neural network to use the second configuration register.

16. A system comprising:
a host processor; and
at least one storage compute device comprising:
a persistent memory;
a sparse neural network comprising specialized neural network circuitry that includes:
a plurality of neural elements each having a transfer function that converts inputs to outputs of the neural elements;
a plurality of connections that couple the inputs to the outputs of different ones of the neural elements, each of the connections having a weighting that affects the connection; and
a configuration register that applies first attributes of the neural network, the first attributes having been defined during a previous learning phase and including which of the inputs and the outputs of the neural elements are coupled by the connections, the transfer functions of the neural elements, and the weightings of the connections; and
a processing unit coupled to the sparse neural network, the persistent memory, and the host processor, the processing unit configured to:
process a first input via a first configuration of the sparse neural network to produce a first output, the first configuration comprising the first attributes of the sparse neural network;
determine that the neural network requires a switch to process a second input;
load a second configuration from a persistent memory, the second configuration comprising changed attributes which include second connections between the neural elements of the sparse neural network, second values of the transfer functions, and second values the weightings, the changed attributes having been defined during the previous learning phase;
copy the second configuration to the configuration register of the sparse neural network to apply the changed attributes to the neural network; and
process the second input via the second configuration of the sparse neural network to produce a second output.

17. The system of claim 16, wherein the persistent memory provides context configuration data out of order relative to data access requests, the controller further configured to receive scheduling information regarding the data access requests; and generate an ordering of context configuration to ensure a desired delivery order.

18. The system of claim 16, wherein the neural network comprises two or more configuration registers, and copying the second configuration to the configuration register comprises: copying the second configuration to a second of the two or more configuration registers, wherein the first configuration is stored in a first of the two or more configuration registers; and signaling to the neural network to use the second configuration register.

* * * * *